United States Patent Office 3,170,776
Patented Feb. 23, 1965

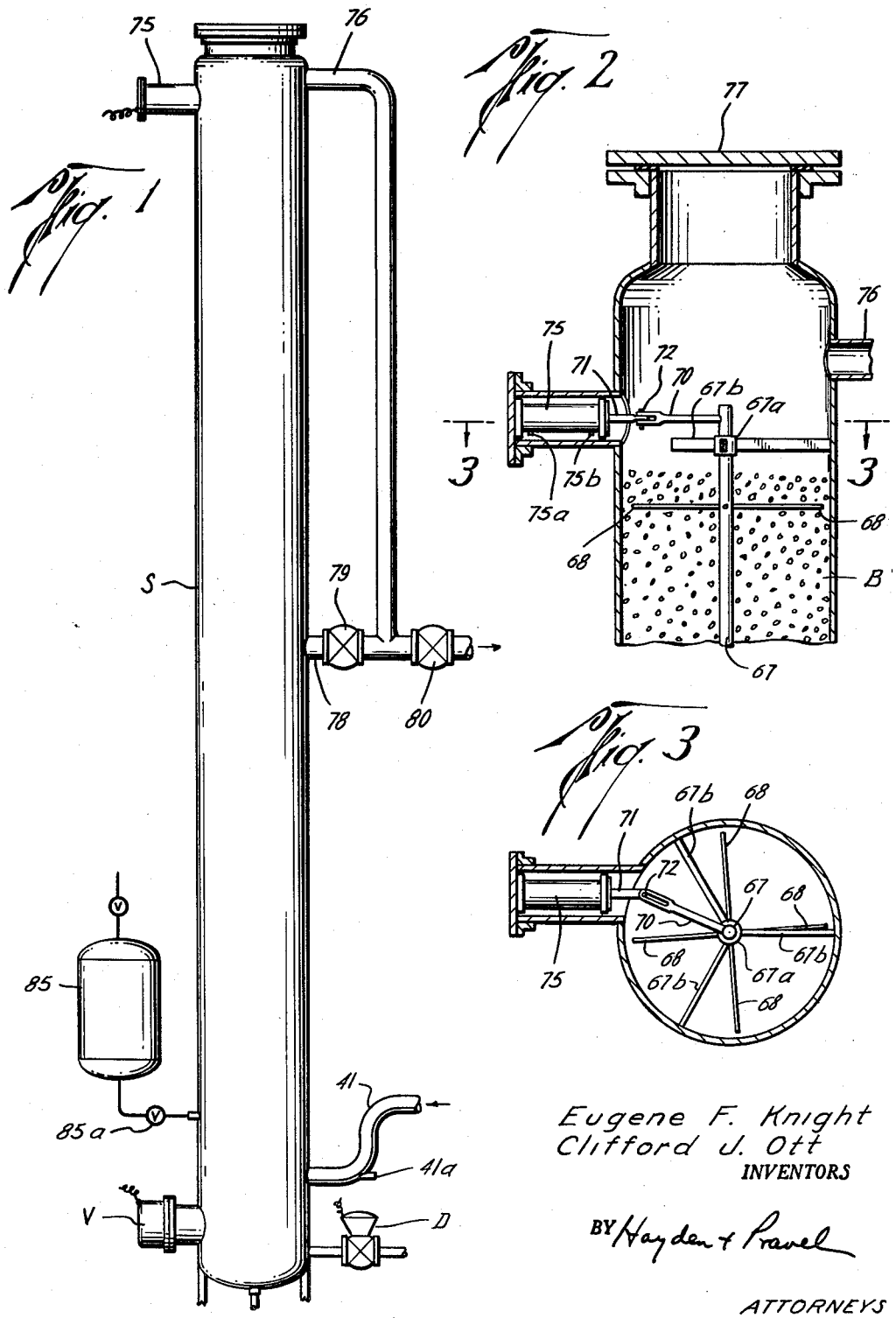

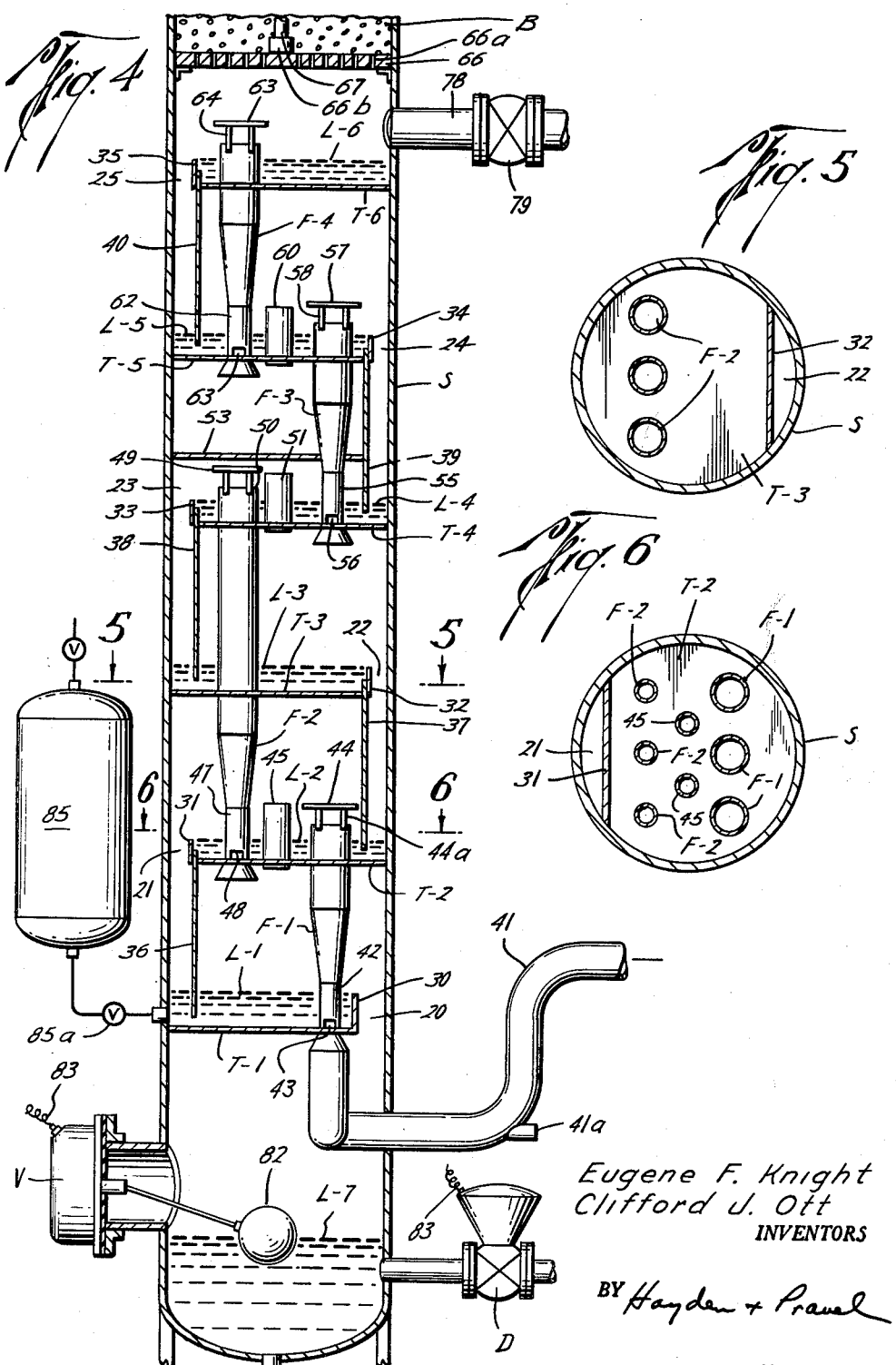

3,170,776
DEHYDRATION APPARATUS
Eugene F. Knight, 1703 Reverse St., Houston 24, Tex., and Clifford J. Ott, 10315 Tolman St., Houston 34, Tex.
Filed Aug. 7, 1961, Ser. No. 129,644
6 Claims. (Cl. 55—221)

This invention relates to new and useful improvements in dehydration apparatus for dehydrating gases.

In the past, various types of apparatus have been employed for the dehydration of vapors or air. Since calcium chloride is a known desiccant, efforts have been made to dry vapors such as hydrocarbon vapors at a well head using calcium chloride, but so far as is known, such prior efforts have been unsatisfactory.

It is an object of the present invention to provide a new and improved apparatus for dehydrating vapors or air, and particularly hydrocarbon vapors from a well head.

Another object of this invention is to provide a new and improved apparatus for dehydrating gases, including hydrocarbon vapors and air, wherein calcium chloride in liquid form is utilized as the desiccant.

An important object of this invention is to provide a new and improved apparatus for the removal of water from vapors or air, wherein the vapors or air are passed through a plurality of trays having a solution of calcium chloride or other desiccant thereon, and wherein means are provided for maintaining a substantially uniform concentration of the calcium chloride solution or other desiccant on such trays to thereby inhibit the deposit or accumulation of solid calcium chloride or other desiccant on the trays which would interfere with the flow of the vapors or air from one tray to the next.

A particular object of this invention is to provide a new and improved apparatus for dehydrating gases, wherein a liquid desiccant is provided on a plurality of trays at different elevations, and wherein venturi flow tubes are provided for picking up the liquid desiccant with the gas passing through the desiccant to circulate the liquid desiccant upwardly on the trays while also providing a liquid flow downwardly on the trays, whereby the concentration of the liquid desiccant is maintained substantially the same on all of the trays.

Still another object of this invention is to provide a dehydration apparatus having a plurality of vertically spaced trays of liquid desiccant, which apparatus is so constructed that liquid desiccant is automatically transmitted from the lower tray to the trays thereabove when the apparatus is started up, so that a rapid starting operation is accomplished.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation illustrating the preferred form of the apparatus of this invention;

FIG. 2 is a view, partly in elevation and partly in section, illustrating the upper portion of the apparatus shown in FIG. 1;

FIG. 3 is a horizontal cross-sectional view taken on line 3—3 of FIG. 2;

FIG. 4 is a view, partly in section and partly in elevation, illustrating the lower portion of the apparatus of this invention;

FIG. 5 is a horizontal cross-sectional view taken on line 5—5 of FIG. 4; and

FIG. 6 is a horizontal cross-sectional view taken on line 6—6 of FIG. 4.

In the drawings, the letter S designates generally the shell or tower of the apparatus of this invention. Within the shell S, a plurality of trays are located such as indicated at T–1 through T–6 for holding liquid desiccant. A bed B (FIGS. 2 and 4) of solid desiccant is also located in the shell S above the trays T–1 through T–6. Briefly, the apparatus of this invention provides for the introduction of vapors or air at the lower end of the shell S for passage through the liquid desiccant on the trays T–1 through T–6 and then for passage through the solid desiccant in the bed B, if desired. As will be explained hereinafter, the gas may pass from the shell S after reaching the tray T–6 and without passing through the bed B of the solid desiccant. Also, as will be more fully explained hereinafter, the apparatus of this invention is provided with a plurality of flow tubes such as indicated at F–1 through F–4 in the drawings (FIG. 4) which serve to pick up the liquid desiccant with the flowing gas so as to accomplish a dehydration of the gas while at the same time providing an upward flow of the liquid desiccant from the lower trays to the upper trays for mixing the liquid desiccant. There is also a downward flow of the liquid desiccant from the upper trays to the lower trays so that the liquid desiccant on the trays T–1 through T–6 remains substantially at the same concentration after a condition of equilibrium is reached.

Considering the invention more in detail, the shell S is a closed elongate vessel or tank and normally is formed of steel or other similar material. The trays T–1 through T–6 are likewise preferably formed of steel or other similar material which is welded or otherwise secured at different heights within the shell S. Each of such trays occupies the entire planar area at its particular elevation, with the exception of openings 20–25, respectively, which provide for downward flow of liquid desiccant from the uppermost trays to the lowermost trays, as will be more fully explained. Each of the trays T–1 through T–6 has an upstanding vertical weir 30–35, respectively, for controlling the level of the liquid on each of such trays. It is to be noted that the weir 30 is preferably substantially twice as high as the other weirs 31–35 so that a double charge of liquid desiccant may be placed on the tray T–1 for starting up the operation of the apparatus, as will be explained. Each of the trays T–2 through T–6 has a downwardly extending vertical plate 36–40, respectively, which is welded thereto and extends downwardly to the tray therebelow. The plates 36–40 extend into the liquid desiccant and below the upper level thereof so as to provide a liquid seal for each area between the trays. Thus, when a gas enters a chamber or area of the shell S between any two of the trays, such gas is confined within that area except for its flow downwardly to the area below as will be more fully explained.

In the preferred form of the invention, the gas such as vapors or air having water vapor present therewith is introduced into the shell S through an inlet line 41 from any well head equipment or other source of such gas. For example, if hydrocarbon vapors are to be dehydrated, the gases would come from other well head equipment which may have previously treated such hydrocarbon vapors. In any event, the inlet line 41 extends into the shell S and is connected to the lower end of the lowermost flow tube F–1. A nozzle 41a which is normally closed is provided in line 41 for introducing steam to flush out the line and the flow tube F–1 in the event it becomes necessary. The flow tube F–1 is formed with a reduced diameter portion 42 which has one or more orifices or ports 43 formed therein. The reduced diameter portion 42 of the flow tube F–1 is located adjacent to the liquid desiccant L–1 in the lower tray T–1. The orifice or orifices 43 are preferably located at the bottom part of the liquid desiccant L–1 so that as the gas flows upwardly through the flow tube F–1, the liquid desiccant from the tray T–1 is picked up by the flowing gas in accordance with the rate of flow of such gas. The velocity of the gas passing through the flow tube F–1 is increased as it passes through the venturi or reduced diameter portion 42. The flow tube F–1 extends upwardly through the tray T–2 above the level of the liquid L–2. The upper end of the flow tube F–1 is open and a baffle plate 44 extends horizontally across the open upper end of the flow tube F–1 but spaced upwardly therefrom by spaced support strips 44a. Such strips 44a are formed of metal or similar material and are welded to the upper end of the flow tube F–1 and the horizontally extending plate 44. Thus, the vapors passing upwardly through the open upper end of the flow tube F–1 may pass outwardly below the plate 44, but they contact such plate 44 to separate or knock out the liquid desiccant and the water vapor which has been picked up by such desiccant from the gas. The liquid thus separated or knocked out of the gas falls to the liquid L–2 and the gas circulates within the area between the tray T–2 and the tray T–3 thereabove.

Heretofore, the invention has been described in connection with only one of the flow tubes F–1 since only one may be used, but it is to be noted that three flow tubes F–1 are illustrated in FIG. 6 and preferably would be used. The invention is of course not limited to any particular number of the flow tubes F–1.

The tray T–2 also has one or more downcomer tubes 45, two of which are illustrated in FIG. 6. Each downcomer tube 45 extends above the upper level of the liquid L–2 and through the tray T–2 to the area therebelow so that gas may flow from the area above the tray T–2 to the area therebelow. The flow tube F–2 is in communication with the area below the tray T–2 and above the tray T–1 so that after the gas passes down through the downcomer tubes 45 it then passes upwardly through the flow tube or tubes F–2. As seen in FIG. 2, it is preferred to provide three of the flow tubes F–2, but one or more may be used in accordance with this invention. The flow tube F–2 is similar to the flow tube F–1 in that it has a venturi or reduced diameter portion 47 with one or more orifices or openings 48 therein for receiving the liquid desiccant as the gas flows upwardly in the tube F–2. The tube or tubes F–2 extends upwardly through the third tray T–3 and also through the fourth tray T–4. The open upper end of the tube F–2 is provided with a baffle plate 49 which is mounted on the tube F–2 with support strips 50. The baffle 49 is thus supported and functions in the same way as the baffle plate 44, heretofore described.

The tray T–4 also has one or more downcomer tubes 51 extending from above the upper level of the liquid L–4 and being open so as to provide fluid communication from the area above the tray T–4 to the area therebelow. It is also to be noted that a baffle plate 53 extends across the shell S above the baffle plate 49 and the downcomer tubes 51 so as to close off the area above the tray T–4. Such baffle 53 is for the purpose of preventing the gas from flowing upwardly from the tube or tubes F–2 directly to the tube or tubes F–4. Instead, the gas is directed through the downcomer tube or tubes 51 into the area between the tray T–3 and the tray T–4 and then into the flow tube or tubes F–3. Again, there are preferably three of the flow tubes F–3, but the invention is not limited to such number. The flow tube or tubes F–3 each has a venturi or reduced diameter portion 55 and one or more orifices or openings 56 for the same purpose as heretofore described in connection with the venturi 42 and the orifice 43. The flow tube or tubes F–3 each has a baffle plate 57 supported on spaced strips 58 which likewise serves the same purpose as the baffle 44 which is supported by the supports 44a. Any of the liquid desiccant and water vapor therewith which is knocked out or separated by means of the baffle 57 falls into the liquid desiccant L–5 while the gas flows through the downcomer tube or tubes 60 and then into the flow tube or tubes F–4. The flow tube or tubes F–4 each has a venturi 62 and one or more orifices 63 for picking up the liquid desiccant as the gas flows therethrough, in the same manner as heretofore described in connection with the venturi 42 and the opening or orifice 43. At the upper open end of the tube or tubes F–4, each is provided with a baffle plate 63 supported on metal strips 64 in the same manner and for the same purposes as heretofore described in connection with the baffle plate 44.

The gas which is discharged from the upper end of the tube or tubes F–4 is confined in the area above the liquid L–6 and may then flow upwardly through a grid 66 which supports the solid desiccant in the bed B. The grid 66 may be formed in any suitable way, but as illustrated it is a metal plate having perforations 66a therein through which the gas is adapted to pass. The plate also is provided with a bearing 66b which is adapted to receive the lower end of a shaft 67 extending upwardly through the bed B. The upper end of the shaft 67 is supported in a bearing 67a which is secured to the shell with support braces 67b. The shaft 67 carries paddles or agitating members 68 at successive vertical elevations so that as the shaft 67 is reciprocated, the agitating rods or members 68 shake the solid desiccant in the bed B to prevent the formation of channels through the bed B by the gas flowing therethrough. The shaft 67 is connected at its upper end to an operating arm 70 which is connected to a piston rod 71 by means of a connecting pin 72 suitably connecting the arm 70 and the piston rod 71 together so that as the piston rod reciprocates, such movement is transmitted through the arm 70 to reciprocate or partially rotate the shaft 67 back and forth. The piston rod 71 is connected with a conventional hydraulic system 75 or with an electric motor or other operating device which is intermittently operated so as to intermittently agitate the solid desiccant in the bed B. When the unit 75 is operated as a hydraulic cylinder, suitable fluid inlets and outlets 75a and 75b are provided in the known manner. Suitable electrical leads would be provided if the unit 75 is operated electrically (not shown).

An outlet pipe 76 is provided at the upper end of the shell S above the bed B for the flow of the gas from the shell or tower S. It is to be noted that the shell S is preferably provided with a removable cover 77 which is held in place by suitable bolts (not shown) or any other suitable means so as to permit entry of equipment or personnel to clean and refill the unit with the dry desiccant in the bed B. In any event, during normal operation, the closure plate 77 is in position as illustrated in FIGS. 1 and 2 so that the gas passes from the bed B outwardly through the flow pipe 76. The flow pipe 76 connects with a lower pipe 78 having valves 79 and 80 therein (FIGS. 1 and 4). Under normal operation, the valve 79 is closed and the valve 80 is open. Therefore, the gas normally flows upwardly through the bed B and then outwardly through the pipe 76 and the valve 80 for further treatment or use. The valve 79 is a by-pass valve which is opened when it is desired to by-pass the gas around the bed B so that it discharges without flowing through such bed B. This condition develops when the concentration of the liquid desiccant on the trays T–1 through T–6 becomes too concentrated, as will be explained more in detail hereinafter. The liquid level at the bottom of the shell S during operation is controlled by a conventional dump valve float or control mechanism V which has the usual float 82 connected thereto so as to maintain the level L–7 at the desired height. The dump valve control V is connected with electrical leads 83 to the dump valve D so as to discharge the liquid from the bottom of the shell S to prevent it from becoming too full.

The apparatus of this invention is charged in any suitable way, but preferably a charging tank or vessel 85 is provided which is filled with the liquid desiccant in a sufficient quantity to charge the tray T-1. The valve 85a therewith is of course closed until it is desired to admit the charge of liquid desiccant to the tray T-1. Assuming that the unit has not been in operation or has been shut down so that there is no liquid desiccant on any of the trays, the liquid desiccant from the vessel 85 is transmitted through the valve 85a and fills the tray T-1. The vapors are introduced through the inlet tube 41 substantially simultaneously to begin the carrying of the liquid desiccant upwardly through the flow tubes to the upper trays, as will be more full explained. When a calcium chloride desiccant is used, which is the preferred desiccant in this invention, the solution in the charging vessel 85 is preferably at fifty percent of its saturation value, although this concentration may of course be varied.

In the operation or use of the apparatus of this invention, it is first charged as previously explained by filling the vessel 85 so that it has at least enough liquid desiccant therein to fill the lowermost tray T-1. After the tray T-1 is filled, the unit is sealed and the gas is introduced through the line 41 as the gas flows upwardly through the liquid L-1 on the tray T-1, it picks up some of the liquid desiccant in a fine spray or mist through the orifices or openings 43. The liquid desiccant is thus carried with the gas upwardly to the baffle plate 44 of each of the flow tubes F-1. The water in the vapor or gas is mixed with the liquid desiccant as it is carried up with the gas to the baffle 44 and therefore the liquid desiccant plus the water vapor therewith is knocked out as it hits the baffle plate 44 of each of the flow tubes F-1. Normally, all of the liquid desiccant and the water vapor in the gas is not separated or knocked out by the first baffle 44 or baffles 44, so that as the gas continues to flow downwardly through the downcomer tubes 45 and then upwardly through the flow tubes F-2, a portion of the liquid desiccant from the tray T-1 is carried upwardly for deposit on the tray T-4. Also, an additional amount of the liquid desiccant is picked up by the gas as it flows through the tube F-2 from the tray T-2. Thus, there is a mixing of the liquid desiccant from the lowermost tray T-1 with the trays T-2 and T-4. The mixing actually continues on up to the trays T-5 and T-6 since the gas continues to flow upwardly through the tubes F-3 and F-4 picking up more liquid desiccant as it goes and depositing some of the portion of the liquid desiccant from the lower trays.

In the meantime, the gas which moves up through the solid desiccant in the bed B still contains some water vapor which dissolves or melts the solid desiccant, normally solid calcium chloride, and a solution falls back through the grid openings 66a to the upper tray T-6 to increase the concentration of such liquid L-6 in the tray T-6. There is therefore a build up in the concentration and the volume of the calcium chloride solution or other liquid desiccant solution on the upper trays as the solid desiccant is dissolved by the water vapor in the gas passing therethrough. The liquid in the upper trays will flow downwardly over the respective weirs with each of the trays so that there is a downward flow of the liquid while there is the upward movement of the liquid with the gas. Thus there is a countermovement of the liquid from the lower trays to the upper trays with the gas and from the upper trays to the lower trays by the liquid feed due to gravity and the overflow of the weirs. By reason of such mixing in both the upward and the downward directions, the concentration of the liquid desiccant on each of the trays becomes substantially uniform throughout the vessel. This prevents supersaturation of the solution or liquid desiccant on any one of the trays and therefore inhibits the depositing of solid calcium chloride or other desiccant on the trays T-1 through T-6. The solid desiccant, if deposited in sufficient quantities prevents the proper flow of the liquid from one tray to another and also interferes with the flow of the gases therethrough.

Furthermore, when the concentration of the liquid desiccant builds up to a point where it might precipitate the solid calcium chloride on the trays, or if it has in fact already started to precipitate such solid calcium chloride or other desiccant on the trays, then the concentration can be promptly reduced by opening the by-pass valve 79. When the by-pass valve 79 is open, the gas does not flow through the bed of the solid desiccant and therefore, none of the solid desiccant is being melted or dissolved during such by-pass period. When the concentration of the calcium chloride solution or other liquid desiccant on the trays T-1 through T-6 is reduced by the addition of the water vapor in the gas passing through the shell S with the by-pass valve 79 open, then the by-pass valve 79 may again be closed and the gas may be directed upwardly through the solid calcium chloride or other desiccant in the bed B.

As previously noted, any excess liquid desiccant is collected at the bottom of the shell or tower S, but the level thereof is controlled by the dump valve float 82 in the known manner.

Periodically, the motor or hydraulic system 75 is actuated to move the piston rod 71 and the arm 70 to swing the paddles or rods 68 in an arcuate movement to shake or agitate the solid calcium chloride to prevent the formation of channels through such solid calcium chloride or other desiccant by the gas flowing therethrough.

It is to be noted that it is preferred to introduce the vapors or air to be treated at the inlet pipe 41 when such gas is at atmospheric pressure and at approximately 90° F. because of the relatively high saturation percentage at that temperature. Also, at about 90° F., the consistency of the calcium chloride solution on the trays is not very thick, whereas at lower temperatures, such solution becomes syrupy. Therefore, although the apparatus is operable at temperatures below 90° F., the temperatures in that vicinity and up to temperatures of about 300° F. would be more desirable. It is to be noted that the apparatus is self-adjusting because as the vapor flow rates increase, the amount of the liquid desiccant picked up also increases. Therefore, the rate of circulation of the desiccant is proportional to the rate of flow of the vapors or gas.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A dehydration apparatus for removing water from gases, comprising a shell having a plurality of vertically spaced trays therein including a first tray and a second tray thereabove, means with each of said trays for holding a layer of liquid desiccant, means for flowing the liquid desiccant downwardly from each of said trays to the tray therebelow, and means for directing a gas having water vapor therewith upwardly through said shell for picking up liquid desiccant with the gas to remove water vapor from the gas and to mix the liquid desiccant on the first tray with the second tray thereabove, said last-mentioned means including a venturi tube extending from below and through said first tray to and through said second tray thereabove and having an opening therein establishing fluid communication from the liquid on the first tray to the interior of the tube and said tube having an outlet for the gas and liquid desiccant above the layer of liquid on the second tray.

2. A dehydration apparatus for removing water from gases, comprising a shell having a plurality of vertically spaced trays therein including a first tray and a second tray therebelow, means with each of said trays for holding a layer of liquid desiccant, means for flowing the liquid desiccant downwardly from said first tray to said second tray therebelow, tube means extending from below and through the second tray to and through the first tray thereabove for directing a gas having water vapor therewith upwardly through said second tray to said first tray thereabove, means for introducing liquid desiccant from said second tray into said tube to remove water vapor from the gas and to discharge liquid desiccant from said second tray onto said first tray thereabove, and said tube means having an outlet for the gas and liquid desiccant above the layer of liquid on the first tray.

3. The apparatus set forth in claim 2, wherein said tube means has a reduced diameter portion forming a venturi, and wherein said means for introducing the liquid desiccant includes an orifice at the level of the liquid desiccant on said second tray for enabling the gas flowing in said tube means to pick up the liquid desiccant and carry it to said first tray thereabove.

4. The apparatus set forth in claim 2, wherein said tube means has a reduced diameter portion forming a venturi, and wherein said means for introducing the liquid desicant includes an orifice at the level of the liquid desiccant on said second tray for enabling the gas flowing in said flow means to pick up the liquid desiccant and carry it to said first tray thereabove, and a baffle at the upper end of said tube means above the liquid desiccant on said first tray thereabove for causing a separation of the liquid desiccant in the gas at said first tray thereabove.

5. The apparatus set forth in claim 2, including a third tray above the first tray, downcomer passage means separate from said tube means for the passage of the gas from above said first tray downwardly into the area above said second tray, and said tubular means extending through said first tray to a third tray above said first tray for the flow of the gas to said third tray.

6. The structure set forth in claim 5, including a baffle on the upper end of said tube means above said first tray for causing the liquid desiccant picked up in the gas as it flows through said tube means to separate and mix with the liquid desiccant on said first tray.

References Cited by the Examiner
UNITED STATES PATENTS

| | | | |
|---|---|---|---|
| 1,854,002 | 4/32 | Subkow | 261—114 |
| 2,523,126 | 9/50 | Long | 261—114 |
| 2,635,949 | 4/53 | Fenske et al. | 55—390 |
| 2,804,940 | 9/57 | Hutchinson | 55—30 |
| 2,995,203 | 8/61 | Maurer | 55—221 |

FOREIGN PATENTS

| | | |
|---|---|---|
| 168,344 | 3/06 | Germany. |
| 530,219 | 12/40 | Great Britain. |

HARRY B. THORNTON, *Primary Examiner.*

HERBERT L. MARTIN, *Examiner.*